(12) United States Patent
Matada (10) Patent No.: US 6,817,521 B1
(45) Date of Patent: Nov. 16, 2004

(54) CREDIT CARD APPLICATION AUTOMATION SYSTEM

(75) Inventor: Anmol N. Matada, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/645,176

(22) Filed: Aug. 21, 2003

(51) Int. Cl.$^7$ ............................................... G06K 5/00
(52) U.S. Cl. .................. 235/380; 235/492; 235/487; 235/493; 705/1; 705/38; 705/44
(58) Field of Search ............................ 235/380, 379, 235/492, 487, 493, 381, 382.5; 705/1, 38, 44

(56) References Cited

U.S. PATENT DOCUMENTS

| | | | |
|---|---|---|---|
| 5,221,838 A | | 6/1993 | Gutman |
| 5,569,897 A | * | 10/1996 | Masuda ...................... 235/379 |
| 5,585,787 A | | 12/1996 | Wallerstein |
| 5,884,271 A | * | 3/1999 | Pitroda ........................... 705/1 |
| 6,016,476 A | * | 1/2000 | Maes et al. ..................... 705/1 |
| 6,315,195 B1 | | 11/2001 | Ramachandran |
| 6,353,811 B1 | * | 3/2002 | Weissman ..................... 705/40 |
| 6,405,181 B2 | * | 6/2002 | Lent et al. ..................... 705/38 |
| 6,729,539 B2 | * | 5/2004 | Kim ............................ 235/379 |
| 2001/0013551 A1 | * | 8/2001 | Ramachandran ....... 235/472.02 |
| 2002/0030099 A1 | * | 3/2002 | Sakashita et al. ........... 235/380 |
| 2002/0088852 A1 | * | 7/2002 | Ohta et al. .................. 235/381 |
| 2003/0045328 A1 | * | 3/2003 | Natsuno ...................... 455/558 |
| 2003/0106935 A1 | * | 6/2003 | Burchette, Jr. .............. 235/380 |
| 2003/0197055 A1 | * | 10/2003 | Ben-Aissa ................... 235/379 |
| 2003/0220876 A1 | * | 11/2003 | Burger et al. ................. 705/50 |
| 2004/0099730 A1 | * | 5/2004 | Tuchler et al. .............. 235/380 |

FOREIGN PATENT DOCUMENTS

| | | |
|---|---|---|
| EP | 1161060 A1 | 12/2001 |
| EP | 1265200 A1 | 12/2002 |
| WO | WO 02/35435 A1 | 5/2002 |
| WO | WO 02/35435 * | 5/2004 |

* cited by examiner

*Primary Examiner*—Karl D. Frech
*Assistant Examiner*—Daniel Walsh
(74) *Attorney, Agent, or Firm*—Diana L. Roberts; Jack V. Musgrove (57) ABSTRACT

A universal credit card system utilizes a portable card access device which stores information associated with multiple bank card accounts, electronically authenticates a user of the bank card accounts, allows the user to select a particular one of the bank card accounts for usage, and then magnetically encodes the selected bank card account information on a separate card substrate (a "universal" credit card) and releasing the card for use. Bank card account information can be stored by inserting an existing bank card into the access device and reading the existing bank card, by manually entering the information using a keypad, or by downloading the information from a computer directly to the card access device. Authentication may be performed using an optical fingerprint scanner. After use, the universal credit card is re-inserted into the card access device and the previously selected bank card account information is erased. The universal credit card system may advantageously be used in conjunction with a credit card application automation system which can issue a new bank card with practically no wait time. The user enters application information into a local computer, which transmits the user application information to a host server via the Internet. Once approved, the host server sends new bank card account information to the local computer, and the local computer can immediately download the information into the card access device, which then generates a universal credit card having the new bank card account information.

20 Claims, 6 Drawing Sheets

CREDIT CARD APPLICATION AUTOMATION SYSTEM

CROSS-REFERENCE TO RELATED APPLICATION

This application is related to U.S. patent application Ser. No. 10/645,199 filed Aug. 21, 2003, entitled "A UNIVERSAL CREDIT CARD SYSTEM", which is hereby incorporated.

BACKGROUND OF THE INVENTION

1. Field of the Invention

The present invention generally relates to credit cards or debit cards (bank cards), and more particularly to a method and system for reducing the number of physical bank cards that an individual needs to carry in order to access many different credit card accounts, and an automated system for applying for and issuing bank cards online via the Internet.

2. Description of the Related Art

In recent years there has been a proliferation of credit cards and credit card users. Not only are there more credit card companies, but it has generally become easier to acquire credit cards. In addition to the all-purpose credit cards, such as American Express™, Visa™, Mastercard™ and Discover™, there is now available a wide variety of special purpose credit cards such as gas-station credit cards, dining cards, grocery cards, etc. Many individuals even have multiple accounts with one or more of these credit card companies, and often a person will have both personal and business credit cards. Additionally, debit cards have become popular which are similar to credit cards but, instead of accumulating charges on a conventional credit card account, these debit cards are used to directly access a bank account (e.g., checking or savings account) which currently has money accessible and simply withdraws the debited amount from the bank account.

As a result of this proliferation of bank cards, individuals frequently find themselves owning or using so many cards that it creates several problems, especially in carrying around the cards physically, locating a particular card for use, and with damage issues in case of loss. Most bank cards issued today have some information encoded on a magnetic stripe, at least the account number for that credit or debit account. Other information on the face of the card includes the account holder's name, the expiration date of that specific card, and oftentimes an additional verification code (typically four digits). This information is usually embossed into the card, but may be printed. Banks cards also often include anti-counterfeit measures such as a holographic image embedded in the card. Since a bank card has the owner's name (or other personal information) in an easily readable format, its loss subjects the owner to possible identity theft. At the very least, it is likely that a misplaced or stolen card will be used to access the credit/debit account, and while there are laws limiting such losses of the owner, the potential harm is still troublesome. Moreover, when a card is lost, a new card must be issued by the bank or credit company, entailing a lengthy wait.

Currently there are no adequate solutions to alleviate these problems. Although the owner can keep the cards somewhere safe, e.g., in a lock box or other secured location, this approach makes the cards inaccessible for day-to-day use. Most bank cards have dimensions of about 85 mm×55 mm×1 mm, so a sizeable collection of these cards takes up significant space when carried about. Active adults who regularly carry around other items such as identification cards (driver's licenses), membership cards, money, photos, etc., have too many things in their purse or wallet, and end up fumbling around to find a desired card.

Many credit cards companies have simplified the process of applying for credit cards using electronic commerce, i.e., online via the Internet. Although such an approach allows near-immediate approval of a new credit or debit card account, it still results in the issuance of additional physical cards and, again, there is a lengthy wait before the card will arrive in the mail.

Credit card systems have been devised which simplify some aspects of bank card usage, but these systems do not fully address the above-mentioned problems. For example, European Patent No. 1,265,200 discloses a credit card system which provides additional limited use credit card numbers and/or cards, e.g., single-use cards. The credit card system finds application in "card remote" transactions such as via a phone or the Internet, as well as "card present" transactions. It also conveniently ties all of the cards to one company but, in doing so, fails to deal with existing cards possessed by a user. That system also results in the issuance of more physical cards.

In European Patent No. 1,161,060, a mobile communication terminal is used to write credit card contract information on a retractable card. The magnetic writer can also delete such credit card contract information from the card. A user interface allows the owner to perform various input operations using a keypad and view information using a liquid crystal display (LCD) panel. The user must carry the mobile communication terminal on his or her person so that the credit card contract information can be read by credit authentication terminals established at merchants or cash dispensers.

In PCT Publication No. WO 02/035435, a system is described for "instantly" issuing a credit card. An individual applies for the credit card at a remote dispensing module, i.e., vending machine, and a real-time decision platform is used to decide whether to approve or decline the application. A security deposit may be required and is accepted at the vending machine. Once approved, the vending machine immediately dispenses the credit card with the appropriate information thereon. This system still requires the individual to carry around multiple bank cards for different credit or debit accounts.

In light of the foregoing drawbacks and limitations, it would be desirable to devise an improved system for managing bank cards which could significantly reduce or minimize the number of credit cards that a user must carry. It would be further advantageous if the system could reduce or eliminate any harm from loss or theft of a card. Such a system would be additionally beneficial if it allowed for the issuance of a new card (i.e., a new account) without any wait time so that the card is ready to use immediately.

SUMMARY OF THE INVENTION

It is therefore one object of the present invention to provide in improved system for managing multiple credit and/or debit cards.

It is another object of the present invention to provide such a method that reduces the number of bank cards that must be carried by an individual.

It is yet another object of the present invention to provide an automated system for applying for a credit card which allows the immediate issuance of a new card.

The foregoing objects are achieved in a method of creating a bank card for monetary transactions, generally comprising the steps of storing information associated with a plurality of bank card accounts in a portable card access device, electronically authenticating a user of the bank card accounts, selecting a particular one of the bank card accounts for usage, encoding information for the selected bank card account in machine-readable form on a separate card substrate (a "universal" credit card), and releasing the card substrate from the card access device after encoding the information. Bank card account information can be stored by inserting an existing bank card into the access device and reading the bank card account information from the existing bank card, or by manually entering the information using a keypad of the card access device, or by downloading the information from a computer directly to the card access device. The authentication may be performed using an optical fingerprint scanner. Encoding may be accomplished by magnetically writing the information for the selected bank card account on a magnetic stripe of the universal credit card. After use, the universal credit card is re-inserted into the card access device and the previously selected bank card account information is erased.

The universal credit card system may advantageously be used in conjunction with a credit card application automation system which can issue a new bank card with practically no wait time. The user of the system enters application information into a local computer, which transmits the user application information to a host server via the Internet. Once approved, the host server sends new bank card account information to the local computer, and the local computer can immediately download the information into the card access device, which then generates a universal credit card having the new bank card account information. The application information may be sent to a third-party company which has the user's profile and applies for a new bank card account on behalf of the user. The computer can further maintain a database of information for multiple bank card accounts including the new bank card account information, and interface with other programs residing on the computer for credit card management. The computer may also be used to program the card access device.

The above as well as additional objectives, features, and advantages of the present invention will become apparent in the following detailed written description.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 1:
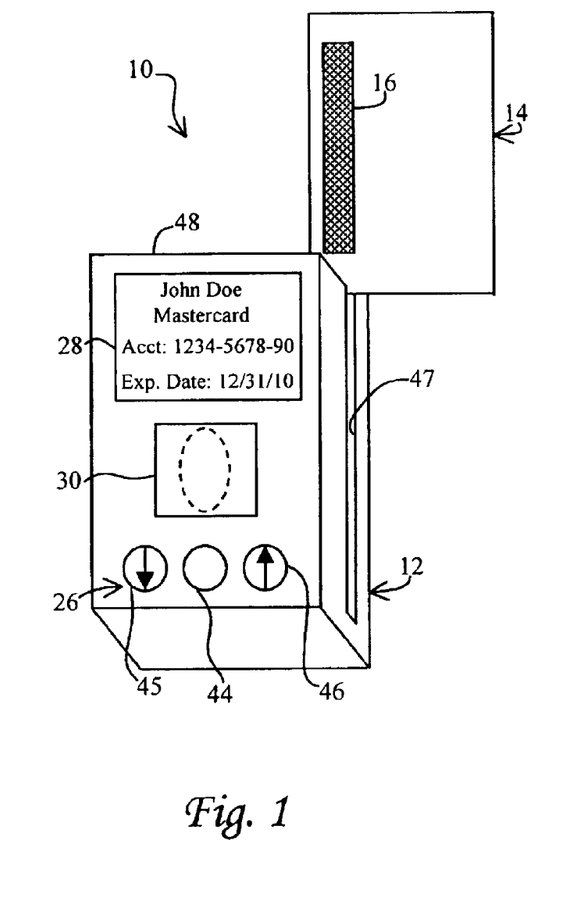
FIG. 1 is a perspective view of one embodiment of a universal credit card system constructed in accordance with the present invention which includes a rewritable credit card and a credit card access device.

With reference now to the figures, and in particular with reference to FIG. 1, there is depicted one embodiment 10 of a universal credit card system constructed in accordance with the present invention. Universal credit card system 10 is generally comprised of a portable credit card access device 12, and a rewritable credit card 14. As explained further below, credit card access device 12 includes a credit card read/write function, and an authentication function. Rewritable credit card 14 is preferably the same size and shape as conventional credit cards, constructed of a polymeric substrate, and includes a magnetic strip 16 or other machine readable/writable medium.

Figure 2:
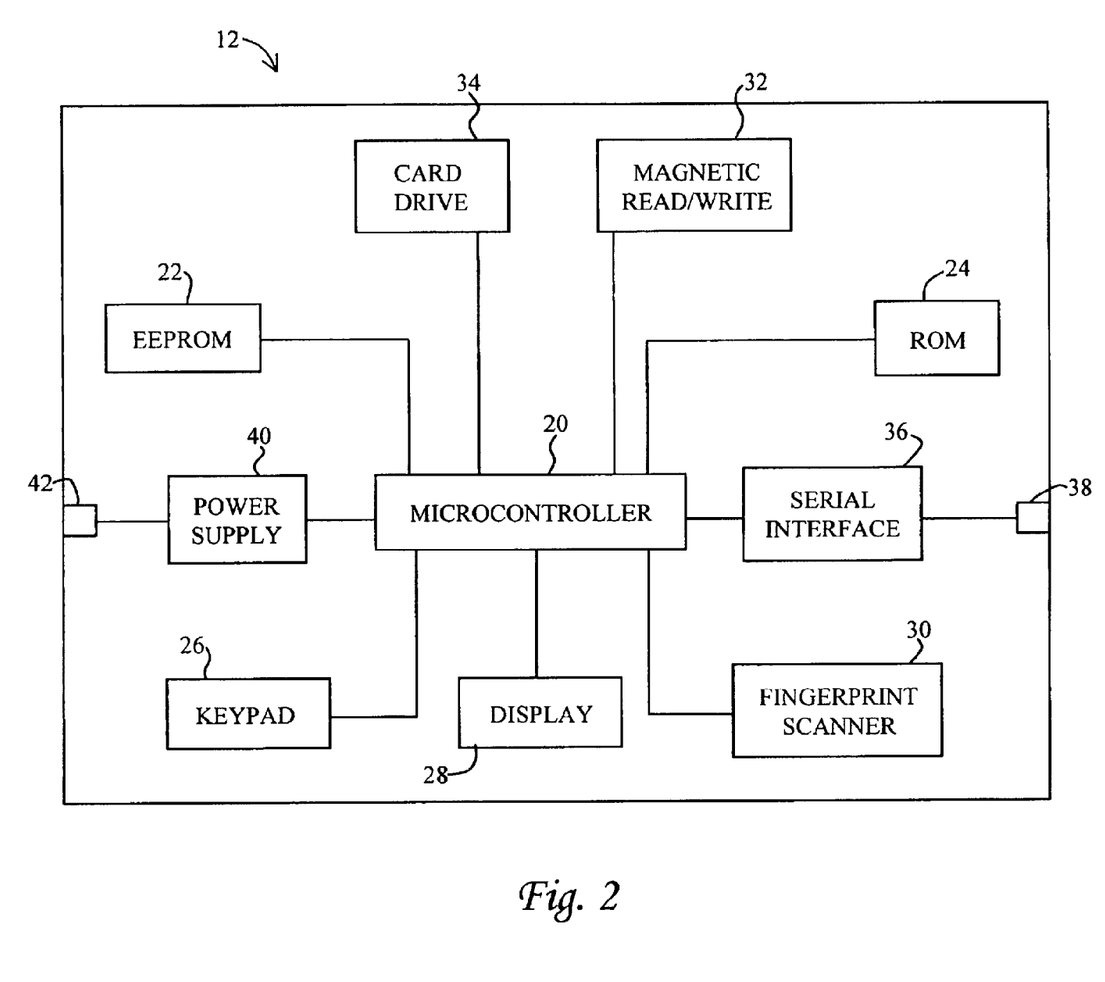
FIG. 2 is a block diagram of the electronic components for one embodiment of the credit card access device of FIG. 1.

The components of credit card access device 12 are shown in FIG. 2. In the illustrative embodiment, credit card access device 12 includes a microprocessor or microcontroller 20 for carrying out program instructions, electrically-erasable programmable read-only memory (EEPROM) 22 for storing program instructions regarding the operation of the device, firmware or read-only memory (ROM) 24 which provides start-up instructions to microcontroller 20, an input device in the form of a keypad 26, an output device in the form of a liquid crystal display (LCD) 28, a fingerprint scanner 30, a magnetic read/write head 32, a card drive 34, and an external interface 36 which allows reprogramming of EEPROM 22. External interface 36 may be a universal serial bus (USB) which is connected to a physical connector port 38. The various components of credit card access device 12 are electrically powered by a power supply 40. In FIG. 2 power supply 40 is shown connected only to microcontroller 20 for simplicity but it may directly provide electrical power to the other components as well. Power supply 40 preferably includes a rechargeable battery which can be recharged via an external power connector 42. In an alternative construction, EEPROM 22 and ROM 24 are incorporated into the single integrated (monolithic) chip that comprises microcontroller 20.

In the embodiment shown in FIG. 1, keypad 26 has a simple design which uses only three buttons: a primary button 44, and two selector buttons 45, 46 (up/down or left/right) which are used to toggle among two or more selections shown on display 28. Keypad 26 could have a complicated construction, but this simpler keypad design allows for a more compact device. Other input devices could alternatively be used, such as a graphical pointer on display 28 which is controlled by a joystick-type button.

LCD 28 is preferably a black-and-white active matrix display panel. Other output devices could alternatively be used, such as a plasma screen, and the display could be in color.

Fingerprint scanner 30 is a high-resolution optical reader that forms an electronic (binary) image of the user's fingerprint when a finger (or thumb) is placed against the surface of the optical reader. Other authentication devices could alternatively be used, such as retinal scanning, or voice recognition.

Card drive 34 controls an actuation mechanism (e.g., a sliding rack and pinion, or a pivoting bay) which releasably receives rewritable credit card 14. In this manner card 14 can be retracted completely within device 12 through a slot 47, accessed using magnetic read/write head 32, and then ejected for use by the owner.

All of the components of credit card access device 12 are enclosed in a protective housing 48.

Figure 3:
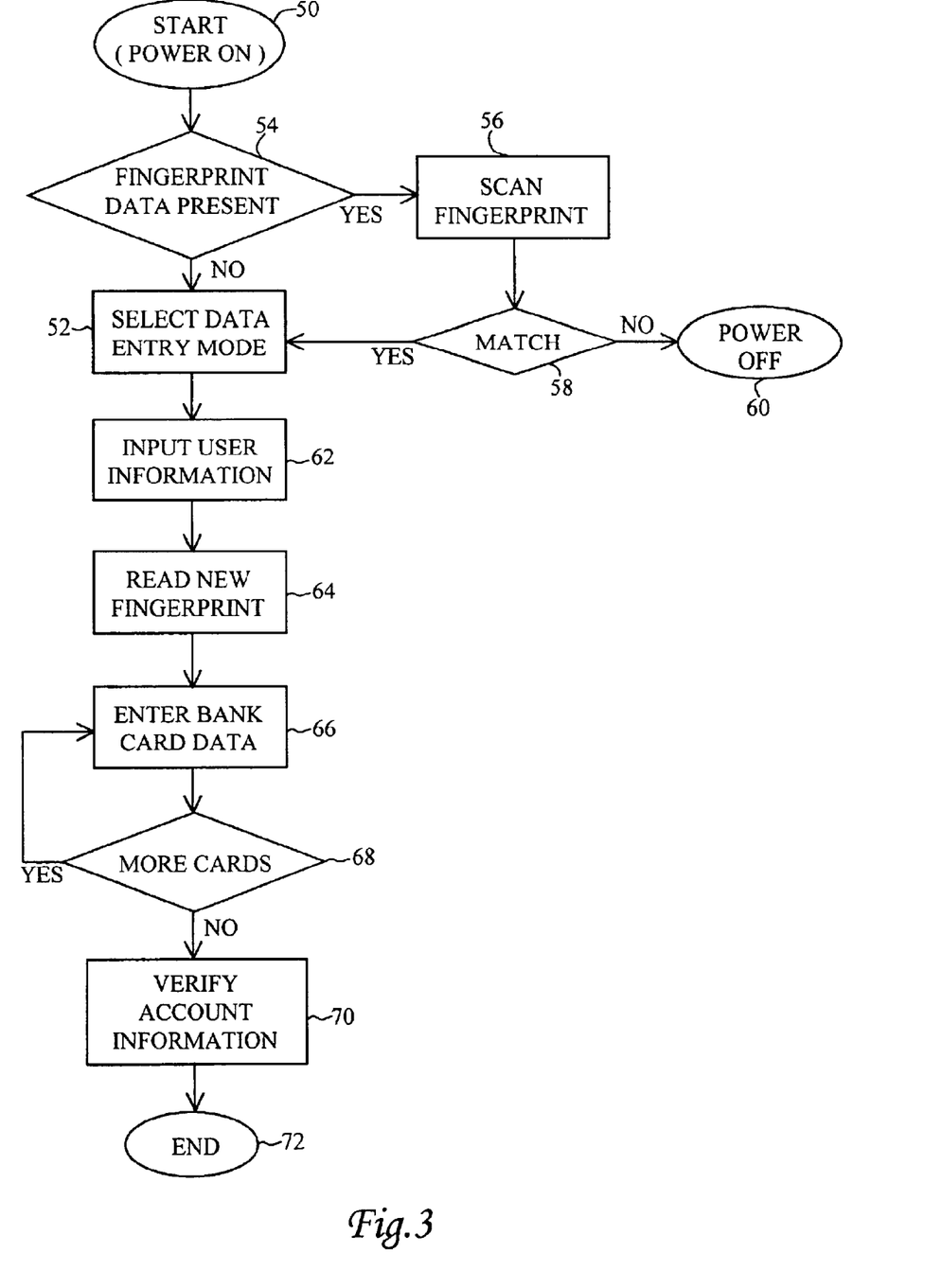
FIG. 3 is a chart illustrating the logical flow for entering data into the credit card access device according to one implementation of the present invention.
Figure 4:
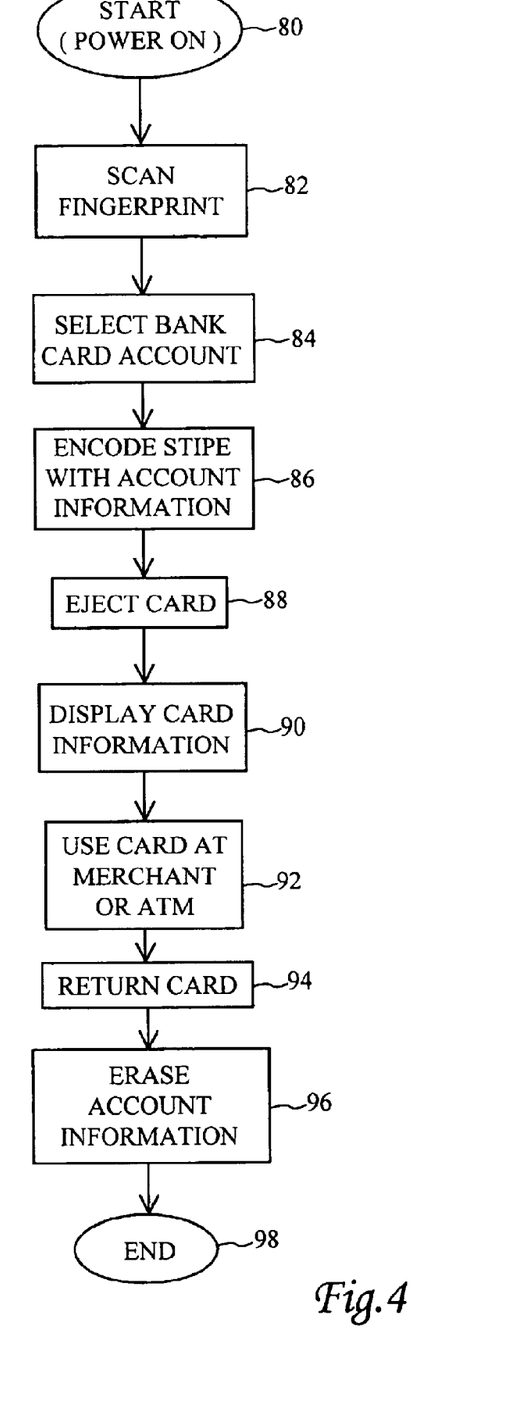
FIG. 4 is a chart illustrating the logical flow for using the credit card access device to generate a credit card according to one implementation of the present invention.

Implementation of universal credit card system 10 involves two operational modes of credit card access device 12: a data entry mode, and a use mode. The logical flow of these two modes is illustrated in FIGS. 3 and 4, and is carried out by the program instructions stored in EEPROM 22. For the data entry mode (FIG. 3) credit card access device 12 is first powered up (step 50), and the data entry mode is selected using keypad 26 (step 52). The device is turned on by pressing button 44 and holding it down for several seconds. A data entry option from a main menu is highlighted on display 28 using one of the toggle buttons 45, 46, and selected by again depressing button 44 once highlighted. In the preferred embodiment, the data entry mode can be entered without concurrent user authentication only when device 12 lacks existing fingerprint information (e.g., the first time the unit is turned on after leaving the factory). If the device has previously been set up using the data entry mode (step 54), then selection of the data entry mode requires authentication via a fingerprint scan (step 56). If the scan does not match the stored fingerprint profile using a conventional comparison routine (step 58), then the device is powered off (step 60).

Once in the data entry mode, the user can input his or her personal information, particularly their name, and optionally an address, social security number, date of birth, etc., using keypad 26 to toggle through and select alphanumeric characters (step 62). Fingerprint scanner 30 is used to read any new fingerprint (step 64). Bank card data is then entered (step 66). Bank card data may be manually entered solely using keypad 26, or an existing credit card (not shown) can be inserted into device 12 and the account information read from the magnetic stripe on the existing card. All other required information which cannot be gleaned directly from the magnetic strip such as a verification code, expiration date, name on card (if different from the previously entered owner's name), etc., is manually entered using keypad 26. This process is repeated for all the credit cards (step 68). The credit card account information can optionally be verified electronically with a third party such as a credit bureau (step 70) via the external programming port. The data entry mode then ends (step 72).

All user and bank information stored in EEPROM 22 can be encrypted to make it more difficult to access the information directly in an unauthorized manner. Thus, universal credit card system 10 is both physically and electronically secure enough to hold the information of all the credit cards a user has. System 10 thereby allows the owner to create a single programmable card for all the different bank card transactions.

In the use mode (FIG. 4), the process again begins with the user turning the system on (step 80), and verifying authorization via a fingerprint scan (step 82). If the user has previously entered information for multiple bank card accounts, he or she then chooses the particular card to be used for this occasion from a list provided on LCD 28 (step 84). Magnetic stripe 16 of universal credit card 14 is then encoded with the appropriate information using magnetic read/write head 32 (step 86), and the card is ejected for use (step 88). LCD 28 can show the details that have been encoded on the card such name, account number, expiration date and type of credit card (step 90). Universal credit card 14 is then used at a merchant or automated teller machine (step 92). After use, the card can be securely returned to credit card access device 12 (step 94), whereupon the information on magnetic stripe 16 is erased (step 96), and the process ends (step 98).

There may be some merchant locations that do not have electronic access to the credit network and instead use the card by placing it in a manual copy machine which makes a rubbing of the embossed surface of a card onto a credit transaction slip. While universal card 14 can be made with no identifying marks printed or embossed thereon, it can alternatively be in the form of a default card with the name, number, expiration date, etc., of a particular one of the user's accounts embossed thereon. Such a card can be used on such occasions, but can still be employed for other uses such as at automated teller machines (ATMs) which only read the information off the magnetic stripe, and so the card can have machine-readable information which differs from the human-readable information marked thereon.

Credit card access device 12 can be a palm-size unit, or can be made even smaller using micro-electronic components and surface-mount technology. A slim design of credit card access device allows it to easily be integrated into a "digital wallet" which can retain other personal or business information of the owner electronically, and have pockets or flaps for receiving other items such as currency or photos.

Universal credit card system 10 may advantageously be utilized in conjunction with an automated system which applies for and issues new credit cards in a simple and quick fashion in accordance with the present invention. In the exemplary embodiment of this credit card application automation system 100 shown in FIG. 5, a personal computer (PC) 102 is used to communicate online (i.e., via the Internet) with a server 104 of a credit card issuing company. PC 102 may also be connected to credit card access device 12 via a USB cable 106. Credit card application automation system 100 allows users to apply for credit cards online and, if approved, receive sufficient information to generate a universal credit card that is ready to use immediately.

Figure 5:
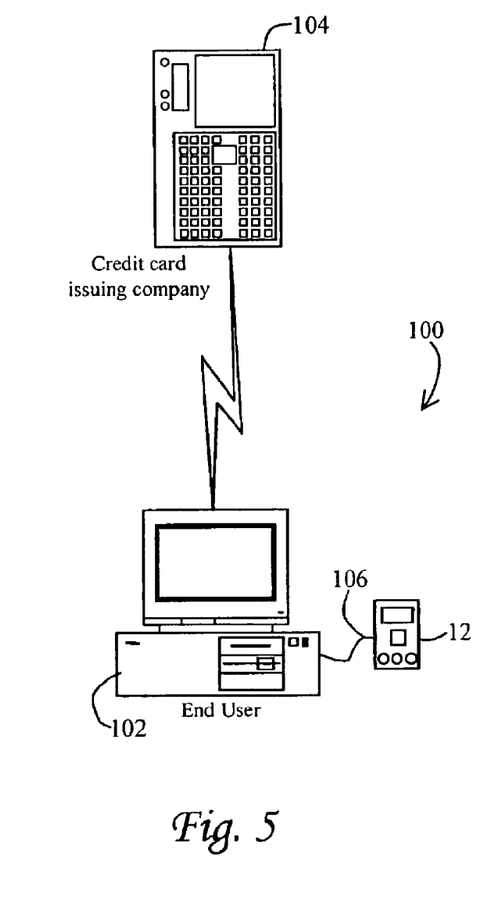
FIG. 5 is a pictorial representation of one embodiment of a credit card application automation system constructed in accordance with the present invention, which utilizes a personal computer that can interface with the credit card access device.
Figure 6:
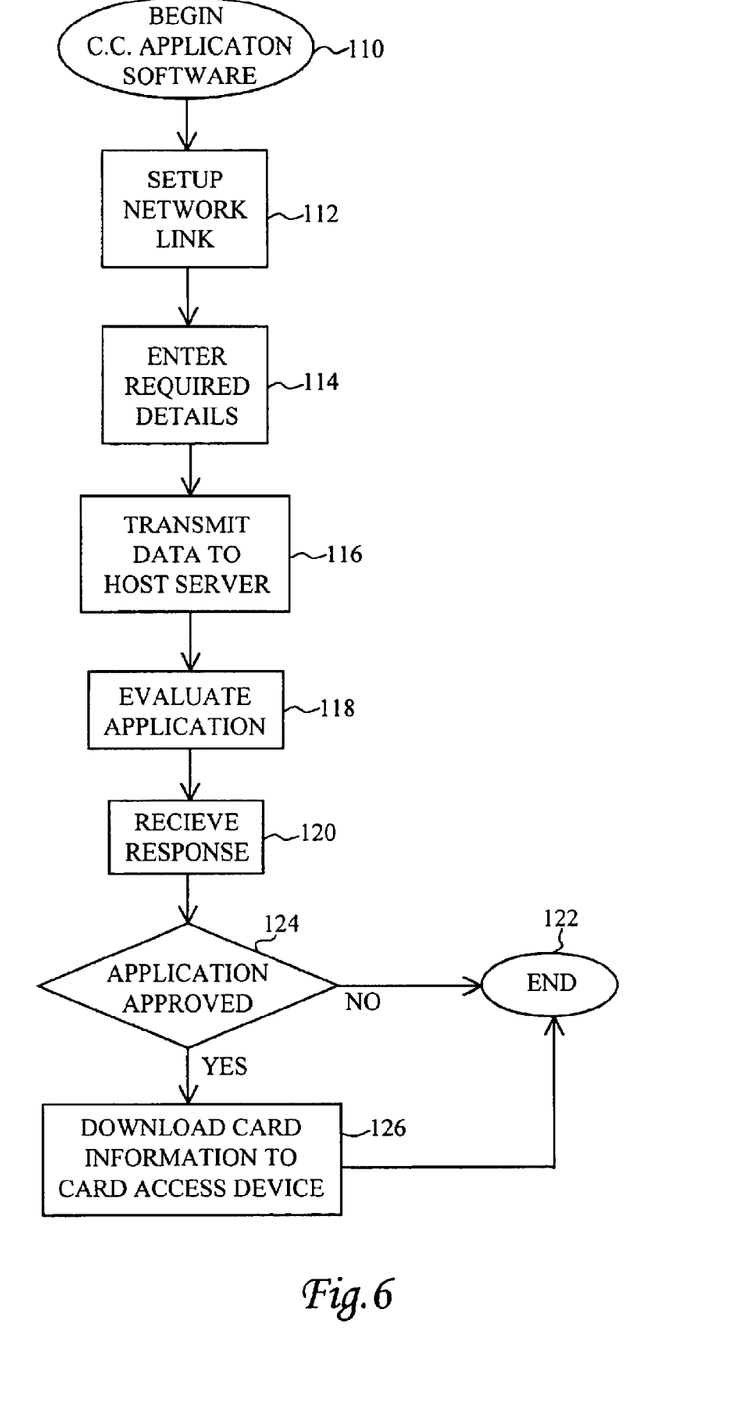
FIG. 6 is a chart illustrating the logical flow for applying for and issuing a new bank card account according to one implementation of the present invention.

The automated application process carried out by system 100 may be further understood with regard to the flow chart of FIG. 6. The process begins by launching the credit card application software that resides on local PC 102 (step 110). If the network communications system on PC 102 has not already established a communications link with the Internet (or other communications medium) such a link is set up (step 112). The user then enters the required details for applying for a credit card or debit card account into PC 102 (step 114), and this information is transmitted to credit card company host server 104 by PC 102 (step 116). The credit card issuing company will then examine the application details and possibly access third-party credit or bank databases to evaluate the application (step 118), and host server 104 will thereafter send a response to PC 102 (step 120). The information transmitted by PC 102 to host server 104, and from host server 104 to PC 102, may be encrypted using, e.g., secure sockets layer (SSL) packets. If the response declines the application, the process ends (step 122). If the application is approved (step 124), then the relevant information for generating a universal credit card is included in the response (account number, expiration data, etc.), and this information is downloaded from PC 102 to credit card access device 12 where it is stored in EEPROM 22 along with information for other bank cards (step 126). The application automation process is then complete, and the user follows the procedure of FIG. 4 to generate a card having the newly issued account information encoded on magnetic stripe 16.

The application may alternatively be sent electronically to a third-party company which has a profile of the user's information and which applies on behalf of the user.

PC 102 can store the account information from the online approval process, and maintain a database of multiple card accounts which may include existing accounts that were not issued online. Any of these accounts can be downloaded directly into credit card access device 12 via cable 106, or the user can manually enter the information using keypad 26. Credit card application automation system 100 may further allow PC 102 to interface with other programs for personal or business credit card management. Those programs might reside on PC 102, or be managed by a remote (online) server. Credit card access device 12 can be programmed via PC 102 for updates or patches.

While the foregoing procedures are sufficient to enable an individual to "possess" multiple credit cards while using only a single physical card, there are other measures that might be implemented to further satisfy bank companies and merchants that the holder of the card is indeed the valid user. One way in which this may be accomplished is a validation process in which the user enters the information into PC 102 as before (e.g., for an existing bank card account), but is prevented from downloading this information to portable credit card access device 12 until after it has been validated. PC 102 may contact the bank company or third-party credit company online, and transmit the associated account information. After the host server of the bank or credit company confirms that the account is valid, PC 102 then allows the information to be downloaded into the same individual's credit card access device, after confirming that the owner of the device matches the owner of the bank card account.

Figure 7:
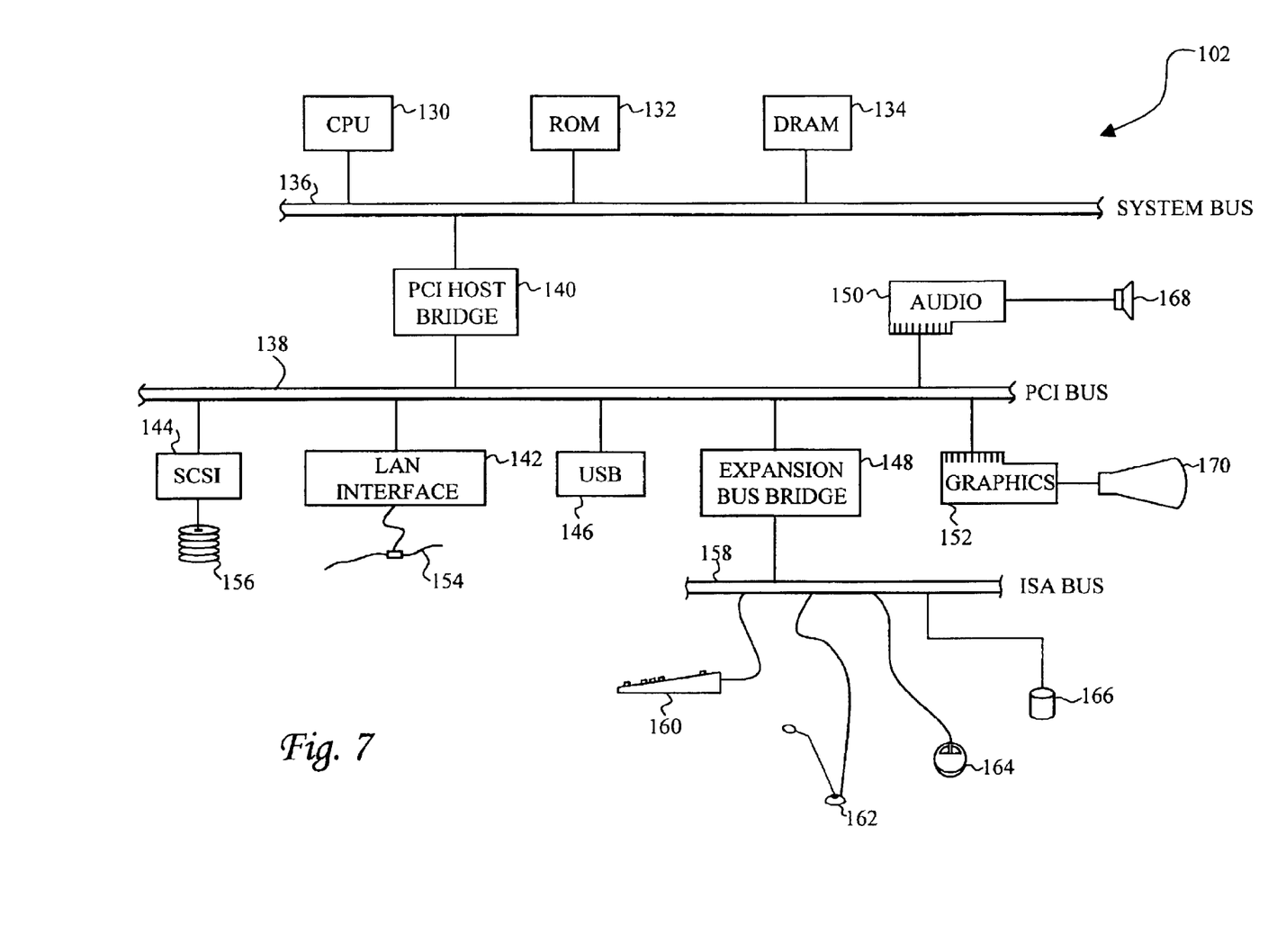
FIG. 7 is a block diagram of one embodiment of a personal computer which may be used to carry out the credit card application automation system of the present invention.

FIG. 7 is a block diagram illustrating an exemplary PC 102 which has been programmed in accordance with the present invention to implement the credit card application automation system. PC 102 includes a central processing unit (CPU) 130 which carries out program instructions, firmware or read-only memory (ROM) 132 which stores the system's basic input/output logic, and a dynamic random access memory (DRAM) 134 which temporarily stores program instructions and operand data used by CPU 130. CPU 130, ROM 132 and DRAM 134 are all connected to a system bus 136. There may be additional structures in the memory hierarchy which are not depicted, such as on-board (L1) and second-level (L2) caches.

CPU 130, ROM 132 and DRAM 134 are also coupled to a peripheral component interconnect (PCI) local bus 138 using a PCI host bridge 140. PCI host bridge 140 provides a low latency path through which processor 130 may access PCI devices mapped anywhere within bus memory or I/O address spaces. PCI host bridge 140 provides a high bandwidth path to allow the PCI devices to access DRAM 134. Attached to PCI local bus 138 are a local area network (LAN) adapter 142, a small computer system interface (SCSI) adapter 144, a universal serial bus (USB) port 146, an expansion bus bridge 148, an audio adapter 150, and a graphics adapter 152. LAN adapter 142 may be used to connect computer system 102 to an external computer network 154, such as the Internet. A small computer system interface (SCSI) adapter 144 is used to control high-speed SCSI disk drive 156. Disk drive 156 stores program instructions and data in a more permanent state, including the program which embodies the present invention. Expansion bus bridge 148 is used to couple an industry standard architecture (ISA) expansion bus 158 to PCI local bus 138. As shown, several user input devices are connected to ISA bus 158, including a keyboard 160, a microphone 162, and a graphical pointing device (mouse) 164. Other devices may also be attached to ISA bus 158, such as a CD-ROM drive 166. Audio adapter 150 controls audio output to a speaker 168, and graphics adapter 152 controls visual output to a display monitor 170, to allow the user to carry out the automated application process as taught herein.

While the illustrative implementation provides the program instructions embodying the present invention on disk drive 156 (storage media), those skilled in the art will appreciate that the invention can be embodied in a program product utilizing other computer-readable media, including transmission media. In one embodiment, the computation steps of the invention may be created as program code using a programming language, such as C++. The program may include conventional aspects of various bank card management applications, and these details will become apparent to those skilled in the art upon reference to this disclosure.

Using the universal credit card system of the present invention allows an individual to minimize the number of credit and debit cards that must be carried while providing a secure device to generate the universal credit card and store account information, minimizing any damage in case of loss of theft. The credit card automation application system of the present invention further allows the individual to have immediate access to and use of a newly approved credit card account, with practically no wait time. Both systems have the further advantage of providing an open architecture for future enhancements. For example, credit card access device 12 could be used more generally to reproduce any type of card (e.g., membership cards with magnetically encoded information), and not just credit and debit cards. An enhanced device could further be devised even without using the card substrate 14, by scanning in an image of the surface of a card, and then displaying that image on display 28 to create a "virtual" card.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A method of issuing a bank card for monetary transactions, comprising the steps of:

entering user application information for at least two bank card accounts into one or more local computers;

transmitting the user application information from the one or more local computers to at least one host server;

receiving new bank card account information for each of the bank card accounts from the at least one host server at the one or more local computers in response to said transmitting step;

downloading the new bank card account information for each of the bank card accounts from the one or more local computers to a single, portable credit card access device; and creating a new bank card having the new bank card account information for only a selected one of the bank card accounts encoded thereon in machine-readable form using the portable credit card access device.

2. The method of claim 1 wherein said transmitting step transmits the application information across the Internet.

3. The method of claim 1 wherein said transmitting step transmits the application information to a third-party company which has a user profile and applies for a new bank card account on behalf of a user.

4. The method of claim 1 where the local computer maintains a database of information for multiple bank card accounts including the new bank card account information.

5. The method of claim 1 wherein said creating step further includes the step of magnetically writing the new bank card account information onto a magnetic readable/writable stripe of a card substrate.

6. The method of claim 1 further comprising the step of programming the credit card access device using the local computer.

7. A computer system comprising:
a display providing output for a user;
a keyboard allowing user input;
a temporary memory device;
a permanent storage device having program instructions and operand data;
a network communications device; and
a processor connected to said display, said keyboard, said temporary memory device, said permanent storage device and said network communications device, said processor executing program instructions from said permanent storage device which allow the user to enter application information for at least two bank card accounts, transmit the user application information to at least one host server using the network communications device, receive new bank card account information from the at least one host server for each of the bank card accounts, and download the new bank card account information for each of the bank card accounts to a single, portable credit card access device.

8. The computer system of claim 7 wherein said network communications device transmits the user application information to the host server across the Internet.

9. The computer system of claim 7 wherein said network communications device transmits the user application information using encryption.

10. The computer system of claim 7 wherein said program instructions maintain a database of information on said permanent storage device for multiple bank card accounts including the new bank card account information.

11. The computer system of claim 10 wherein said program instructions further allow the user to manually enter existing bank card account information into the database.

12. The computer system of claim 7 wherein said program instructions interface with one or more other programs residing on said permanent storage device for credit card management.

13. The computer system of claim 7 wherein said program instructions program the credit card access device.

14. An automated credit card application system comprising:
a card substrate having a machine readable/writable medium;
a portable credit card access device which stores bank card account information for at least two bank card accounts, and writes selected bank card account information for only one of the bank card accounts to said machine readable/writable medium of said card substrate subject to user authentication; and
a computer having program instructions which allow a user to enter application information for each of the bank card accounts, transmit the user application information to at least one host server using the network communications device, receive new bank card account information for each of the bank card accounts from the at least one host server, and download the new bank card account information for each of the bank card accounts to said portable credit card access device.

15. The automated credit card application system of claim 14 wherein said computer transmits the user application information to the host server across the Internet.

16. The automated credit card application system of claim 14 wherein said computer transmits the user application information using encryption.

17. The automated credit card application system of claim 14 wherein said computer maintains a database of information for multiple bank card accounts including the new bank card account information.

18. The automated credit card application system of claim 17 wherein said program instructions further allow the user to manually enter existing bank card account information into the database.

19. The automated credit card application system of claim 14 wherein said program instructions interface with one or more other programs residing on said computer for credit card management.

20. The automated credit card application system of claim 14 wherein said program instructions program said credit card access device.

* * * * *